April 12, 1932.    R. P. CALLARD ET AL    1,853,505
GLASS CUTTING APPARATUS
Filed Oct. 20, 1925    2 Sheets-Sheet 1
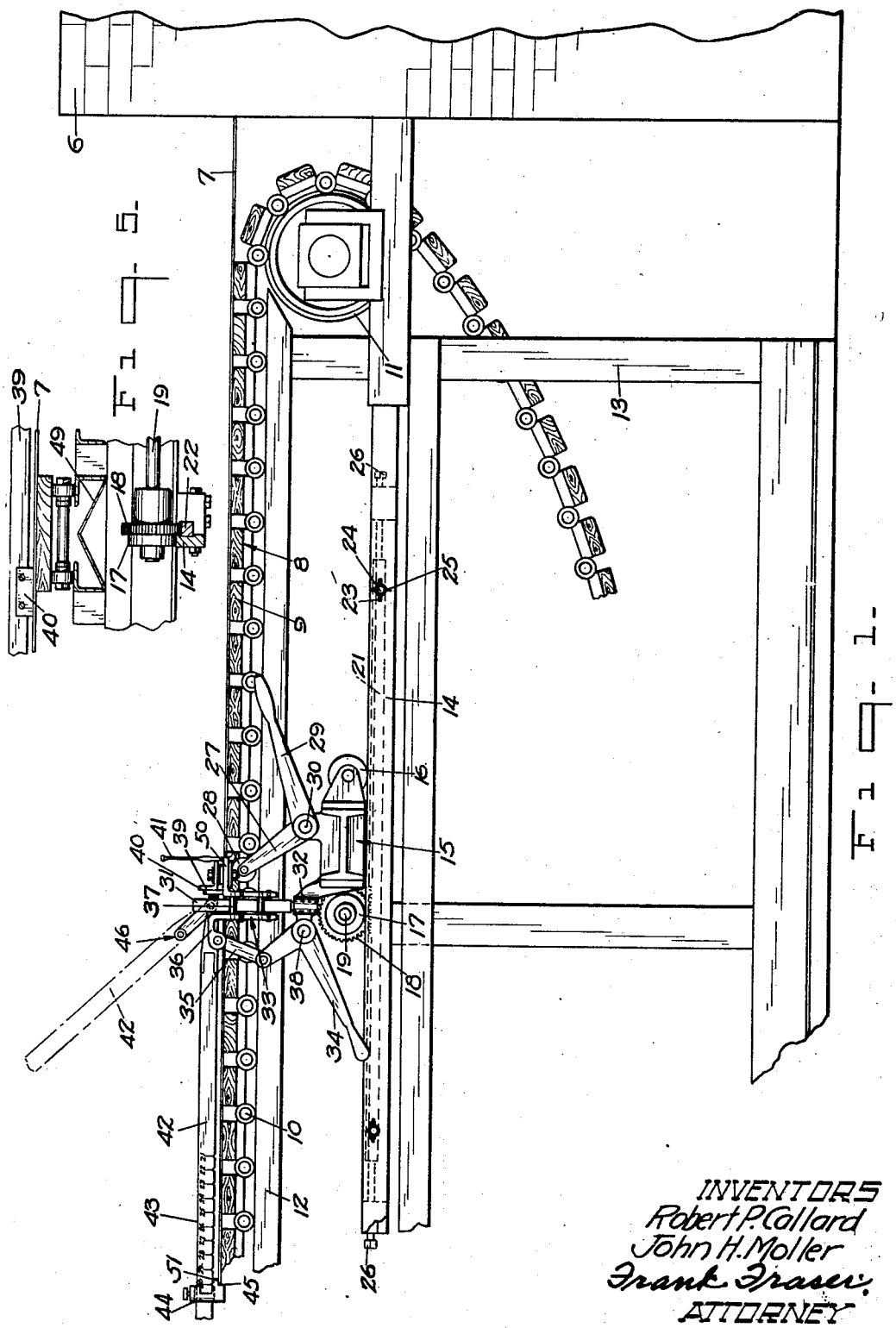
INVENTORS
Robert P. Callard
John H. Moller
Frank Fraser
ATTORNEY April 12, 1932.  R. P. CALLARD ET AL  1,853,505
GLASS CUTTING APPARATUS
Filed Oct. 20, 1925  2 Sheets-Sheet 2
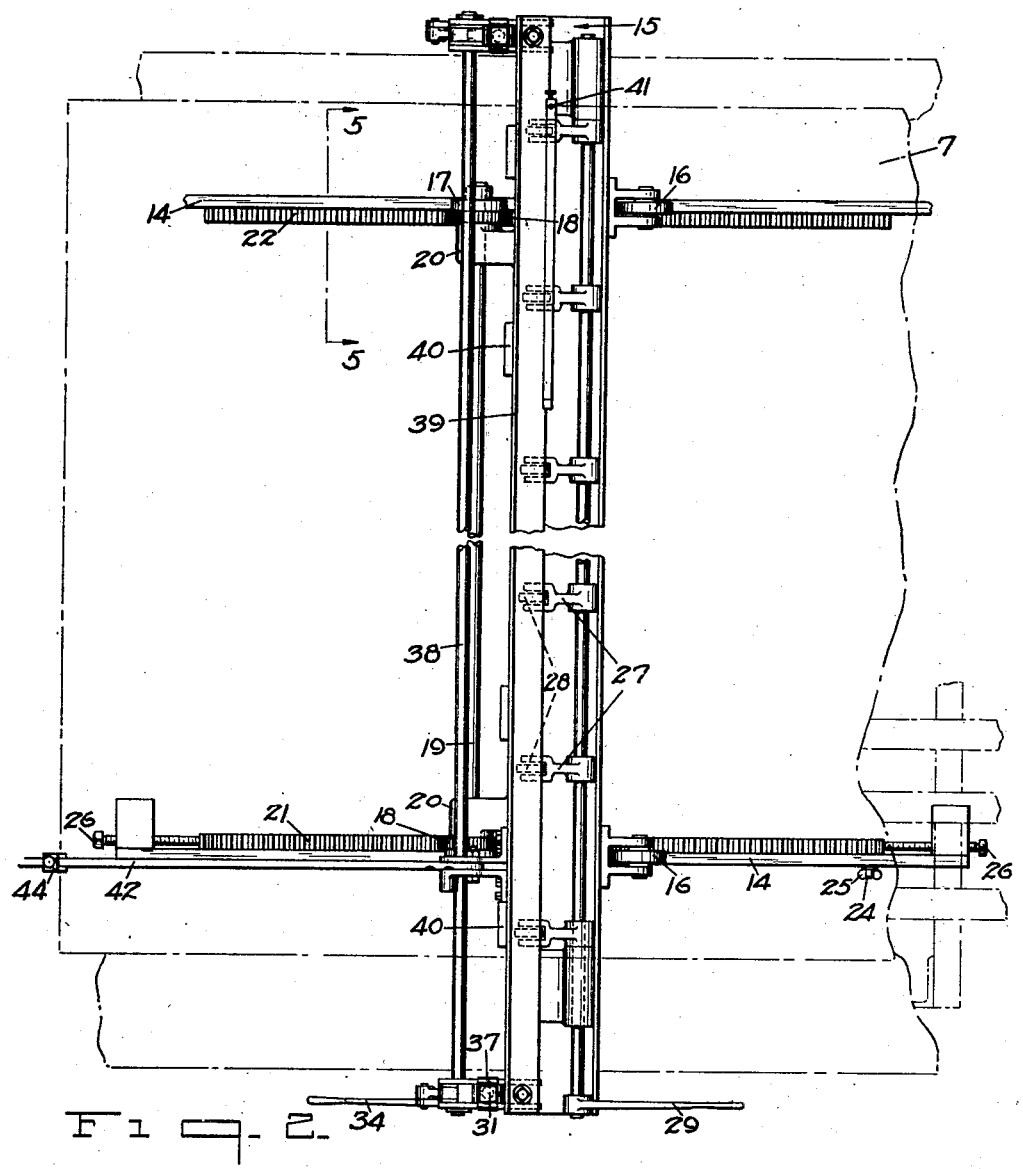
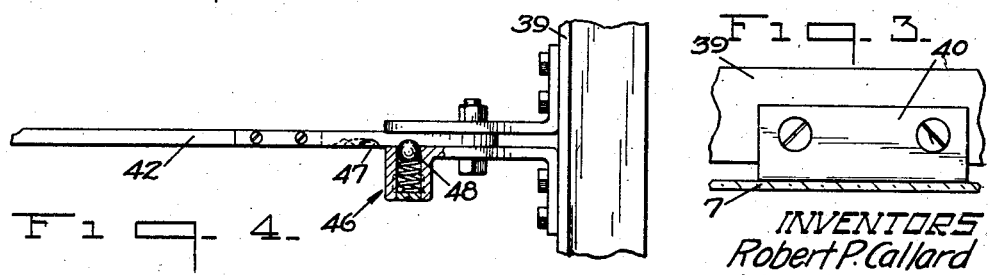
INVENTORS
Robert P. Callard
John H. Moller.
Frank Fraser
ATTORNEY Patented Apr. 12, 1932

1,853,505

UNITED STATES PATENT OFFICE

ROBERT P. CALLARD AND JOHN H. MOLLER, OF CHARLESTON, WEST VIRGINIA, ASSIGNORS TO LIBBEY-OWENS-FORD GLASS COMPANY, OF TOLEDO, OHIO, A CORPORATION OF OHIO

GLASS CUTTING APPARATUS

Application filed October 20, 1925. Serial No. 63,623.

The present invention relates to sheet glass cutting apparatus, and has particular reference to means for cutting a ribbon of glass into sheet lengths.

An important object of the invention is to provide an apparatus wherein a ribbon of glass may be transversely scored, the score mark being parallel to the preceding cut.

A further object of the invention is to provide a cutting apparatus wherein a cutter guide and breaker arm are movable as a unit so that the sheet may be scored, after which the breaker arm may be used to separate the sheet from the ribbon from which it is cut.

Another object of the invention is to provide for simultaneous movement of the apparatus with the sheet during the scoring operation.

Still another object of the invention is to provide an apparatus for permitting a predetermined length of glass to be cut from a ribbon, the edges of the glass being parallel to reduce waste.

Other objects and advantages of the invention will become apparent during the course of the following description.

In the drawings wherein like numerals are employed to designate like parts throughout the same, Fig. 1 is a side elevation of the device in use, Fig. 2 is a top plan view thereof, Fig. 3 is an enlarged view of one of the cutter guide gripping pads, Fig. 4 is an enlarged plan view of a portion of the measuring arm, and Fig. 5 is a sectional elevation on line 5—5 in Fig. 2.

This invention is particularly well adapted for use in connection with the Colburn Patent 1,248,809, granted Dec. 4, 1917, wherein the ribbon or sheet of glass is annealed in a horizontal leer, and is passed upon the cutting table in a horizontal position. Of course it is not necessarily limited to this particular construction. Heretofore the ribbon has been divided into sheet lengths by a man positioned at the end of the leer and along the side of the cutting table. The type of cut has been dependent upon the skill of the particular operator. It is difficult for even a skilled operator to score the sheet exactly parallel to the preceding cut due to the fact that the sheet is moving in a direction perpendicular to the score being made. If the score is not parallel to the preceding cut or at right angles to the edges of the sheet, considerable waste is had when squaring the sheet up for commercial purposes.

It is an aim of the present invention to overcome this waste which has heretofore been had by reason of the fact that a cutter guide is used which is movable with the sheet so that the cutter can run his cutting tool or scoring tool along the cutter guide in a manner that each score will be parallel to the preceding cut.

The numeral 6 in Fig. 1 designates the end of the leer in which the sheet 7 is annealed. The sheet, after it passes from the end of the leer 6, is supported upon a movable cutting table 8 which usually comprises a plurality of wooden blocks 9 connected together as by the pivot joints 10. The blocks 9 are connected together in an endless belt formation and are driven by means of the rotatable drums 11 arranged within the loop formed by the said table. Rails 12 are provided and are adapted to support the upper horizontal run of the cutting table 8 in a horizontal plane. Supports 13 are used to support the rails 12 and to also hold tracks 14. The tracks 14 are arranged below the upper horizontal run of the rails 12. A truck 15 is supported by means of the rollers 16 and 17 upon the tracks 14. Unitedly attached to the rollers 17 on one side of the truck are the pinions 18. A roller and pinion unit is keyed or pinned upon each end of the shaft 19 mounted in bearings 20, on the side of the truck 15. The tracks 14 are of such width to accommodate the rollers 16 and 17 only. Attached to the inner side of the tracks are racks 21 and 22 adapted to receive the pinions 18. The rack 21 is slidably mounted in slots 23 in the track 14 by the bolts 24, and is locked thereto by the winged nuts 25. In order to make and maintain the ends of the apparatus parallel and in alignment, the rack 21 is adjustable back and forth longitudinally by the jack screws 26 provided at the ends of the track 14. Positioned above the racks 21 and 22 and extending substantially the entire length thereof, are guards 49 which serve as a means to protect the racks from particles of glass or dirt falling therein. The particular construction and arrangement of the racks 21 and 22 and of the guards therefor is more clearly described and claimed in our co-pending application Serial No. 80,878 filed Jan. 13, 1926. Pivoted to a portion of the truck 15 are a plurality of breaker arms 27 carrying rollers 28 at their ends and a lever 29 at the opposite end thereof. The breaker arms 27 and lever 29 are all keyed to the shaft 30, and by rocking the lever 29 the rollers 28 are brought up and engage the sheet 7 and raise the same from the blocks which is sufficient to cause the scored sheet to separate. The breaking device just described is set forth in a patent to Moller 1,499,393, and is particularly well adapted for use in combination with the present invention.

The cutter guide mechanism comprises upright guides 31 carried in the brackets 32 attached to the truck 15. The cross heads 33 are slidable on the guides 31, being moved by the bell-crank 34, and link 35 pivotally connected to the arm 36 carried by the said crossheads 33. Bearings 37 are provided to permit the cross-heads to be moved up and down on the guides 31 very readily so that by rocking the bell-crank lever 34, the cross-heads may be moved up or down with respect to the sheet 7. The simultaneous movement of the cross-heads and links at each side of the apparatus is provided for by the rock shaft 38 to which the bell-crank 34 is keyed. A cutter guide plate 39, extending transversely across the sheet, is connected to the two crossheads 33, by being bolted to the cross-head arms 50. Suitable friction pads 40 are attached to the plate and extend below the bottom surface thereof. When the plate is in a lowered position, the pads will rest, with the weight of the entire cutter guide mechanism, on the surface of the moving sheet 7. The friction existing between the glass and pads will usually be sufficient to cause the sheet to move the entire apparatus in unison with it. When the plate 39 is in lowered position a cutting or scoring member 41 may be run transversely across the sheet, being held in engagement with the said plate during the scoring movement so that a straight score will be had. Each score will be substantially parallel to the previous one, as provided for by the rack and pinion paralleling feature mentioned above.

To determine the length of the sheet being cut from the ribbon 7, a gage arm 42 is pivotally associated with the guide plate 39. The gage is graduated as at 43 and carries at its end an adjustable block 44 having the shoulder 45 formed thereon which is adapted to abut the free end of the sheet to be cut. When it is desired the gage arm 42 can be swung to the position shown by the dotted lines in Fig. 1, and locked in this position by means of the ball and spring latch 46 when not in use. The gage arm is provided with a recess 47 adapted to receive the locking ball 48, as shown in Fig. 4.

In use, the gage arm 42 is adjusted for whatever length of sheet is desired, and the block 44 is placed in operable engagement with the end 51 of the ribbon 7. During the adjustment of the gage arm the guide plate is locked in elevated position by the bell-crank 34 and link 35, carrying the friction pads 40 out of engagement with the sheet. After the desired adjustment is made, the guide plate is lowered and the pads are then in frictional contact with the moving sheet, the moving sheet serving as a means for transmitting longitudinal movement to the device. The scoring implement 41 may be run transversely across the sheet to score it, preferably after the device is moving with the sheet. The breaker arms are then brought into engagement with the sheet while the device is still in motion to raise it off the cutting table sufficient to cause a separation. The operation is then repeated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass cutting apparatus, a moving table for supporting a movable sheet of glass to be cut, a cutter guide extending transversely across the sheet, cross-heads attached thereto, guide members on which the crossheads are vertically slidable, links attached to the cross-heads, means for supporting the guide members and links, and a bell-crank pivotally connected to said links for raising and lowering the cutter guide relative to the sheet.

2. In sheet glass cutting apparatus, a moving table for supporting a movable sheet of glass to be cut, a cutter guide extending transversely across the sheet, cross-heads attached thereto, guide members on which the crossheads are vertically slidable, pairs of links attached to the cross-heads, means for supporting the guide members and links, a cross shaft connecting the pairs of links, and a lever associated with the links and shaft, for equally raising and lowering the cutter guide throughout its entirety.

3. In sheet glass cutting apparatus, a moving table for supporting a moving sheet of glass, a movable truck supported beneath the sheet, a cutter guide above the sheet carried by said truck, friction pads attached to the guide for gripping the sheet, and means carried by the truck and engaging the guide for raising and locking the guide to thereby hold the pads out of engagement with the sheet.

4. In sheet glass cutting apparatus, a movable table for supporting a movable sheet of glass to be cut, a cutter guide extending transversely across the sheet, cross-heads attached thereto, guide members on which the cross-heads slide, links attached to the cross-heads, means for supporting the guide members and links, and means connected thereto for raising and lowering the cutter guide, said cutter guide when in lowered position adapted to frictionally engage the sheet to be moved thereby.

5. In sheet glass cutting apparatus, a movable table for supporting a moving sheet of glass, a track disposed beneath a portion of the table, a combined cutter guide and breaker movable along the track, means attached to the guide and engaging the sheet causing the guide to be moved by said sheet, a measuring means attached to the guide and engageable by the free end of the sheet, and means for locking said means out of operating engagement with the sheet.

6. The combination with a moving table for supporting a moving sheet of glass, of a track disposed beneath a portion of the table, a vertically movable cutter guide movable along the track, means attached to the guide and frictionally engaging the sheet causing the guide to be moved thereby, and a measuring means pivoted to the guide and engageable by the free end of said sheet.

7. The combination with a moving table for supporting a moving sheet of glass, of a track disposed beneath a portion of the table, a vertically movable cutter guide movable along the track, means attached to the guide and frictionally engaging the sheet causing the guide to be moved by and with the same, a measuring means pivoted to the guide and engageable by the free end of the sheet, and means for locking said measuring means in a raised position out of engagement with said sheet.

8. The combination with a moving table for supporting a moving sheet of glass, of a movable truck, a cutter guide positioned across the sheet and mounted on said truck, gripping pads attached to said guide and engageable with the moving sheet for causing simultaneous movement of said truck and guide therewith, and means for raising and lowering the opposite ends of said cutter guide equal distances simultaneously to move the gripping pads out of or into engagement with said moving sheet.

9. The combination with a moving table for supporting a moving sheet of glass, of a movable truck, a vertically movable cutter guide positioned across the sheet and mounted on said truck, gripping pads attached to said guide and engageable with the moving sheet for causing simultaneous movement of said truck and guide therewith, and a measuring means pivoted to the guide and engageable by the free end of the sheet.

10. The combination with a moving table for supporting a moving sheet of glass, of a movable truck, a cutter guide positioned across the sheet and mounted on said truck, gripping pads attached to said guide and engageable with the moving sheet for causing simultaneous movement of the truck therewith, a measuring means pivoted to the guide and engageable by the free end of the sheet, and means for locking said measuring means in a raised position out of engagement with said sheet.

11. The combination with a moving table for supporting a moving sheet of glass, of a movable truck supported beneath the sheet, a cutter guide extending across the sheet carried by said truck, friction pads attached to the guide and adapted to grip the sheet for causing said guide to be moved therewith, and means for moving the opposite ends of the cutter guide equal distances simultaneously relative to the sheet to bring the friction pads into or out of engagement therewith.

12. In sheet glass apparatus, a movable table for supporting a moving sheet of glass to be cut, a cutter guide movable vertically to and from the sheet, means carried by the guide and engageable with the sheet, means for supporting the cutter guide whereby the same may be moved with the sheet, vertically movable breaker arms associated with the guide and positioned beneath the sheet, and means for moving the breaker arms and cutter guide vertically independently of one another.

13. The combination with a moving table for supporting a moving sheet of glass, of a movable truck, a cutter guide positioned across the sheet and carried by said truck, means attached to said guide and engageable with the moving sheet for causing simultaneous movement of said truck and guide therewith, means for raising and lowering the opposite ends of the cutter guide equal distances simultaneously, and breaker arms carried by and movable with the truck and positioned beneath the sheet.

14. The combination with a moving table for supporting a moving sheet of glass, of a movable truck, a cutter guide positioned across the sheet and carried by said truck, means attached to said guide and engageable with the moving sheet for causing simultaneous movement of said truck and guide therewith, means for raising and lowering the opposite ends of the cutter guide equal distances simultaneously, breaker arms carried by and movable with the truck and positioned beneath the sheet, and means for moving the breaker arms and cutter guide vertically into and out of engagement with the sheet independently of one another.

Signed at Charleston, in the county of Kanawha and State of West Virginia, this 15th day of October, 1925.

ROBERT P. CALLARD.
JOHN H. MOLLER.